HOLDING CIRCUIT FOR SERVO MECHANISM

Filed June 10, 1964

INVENTOR
JERROLD P. BARROSSE

BY Edward M. Farrell

ATTORNEY

United States Patent Office 3,399,391

Patented Aug. 27, 1968

3,399,391

HOLDING CIRCUIT FOR SERVO MECHANISM

Jerrold P. Barrosse, North Hills, Pa., assignor to Sperry Rand Corporation, New York, N.Y., a corporation of Delaware Filed June 10, 1964, Ser. No. 374,054
6 Claims. (Cl. 340—174.1)

ABSTRACT OF THE DISCLOSURE

A control circuit for stabilizing the operation of a servo mechanism for positioning a magnetic head over a recording drum is provided. The control circuit includes a source of recurrent reference pulses and a counter mechanism. On positioning the head an error voltage is applied to the control circuit so as to delete the application of reference pulses to the counter. After a predetermined delay period the counter resets and renders the servo mechanism operative. When the head mechanism nears its new position the error voltage diminishes in magnitude and the recurrent pulses are again applied to the counter. After a predetermined pulse count the counter operates to render the servo mechanism inoperative whereby small transient error voltages are rendered ineffective to cause a fortuitous operation of the servo mechanism.

Figures 1, 2, 3:
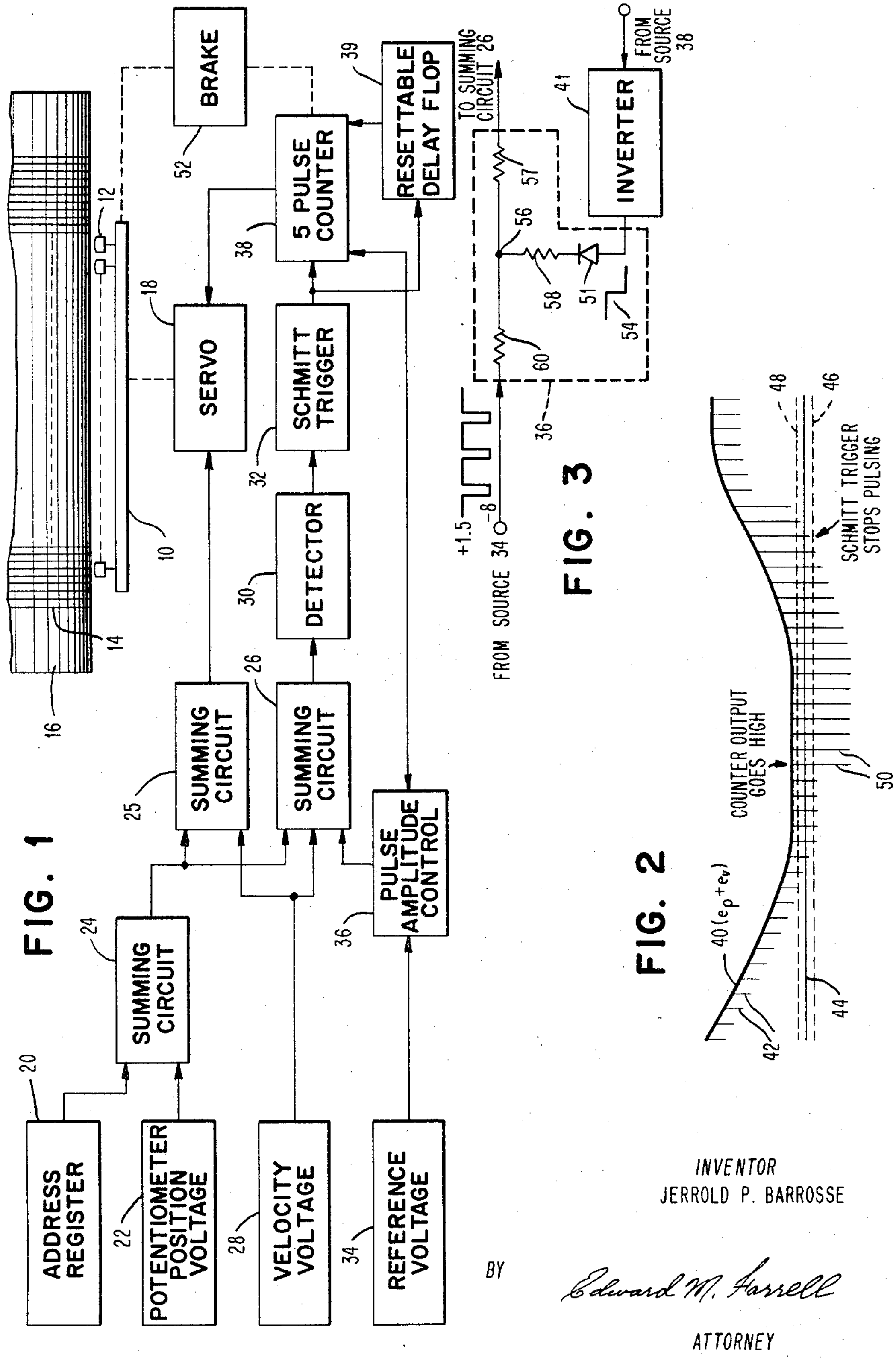

This invention relates to a positioning system, and more particularly to a carriage positioning system for quickly positioning a transducer over a selected portion of a recording medium and maintaining the transducer over the selected portion.

Mass storage systems involving magnetic drums are well known. In such systems, information may be magnetically stored on information tracks on the drum. A drum, for example, may include as many as 2,000 or more information tracks. The information track, in turn, may be divided into sectors. In some magnetic drums, the capacity may include as many as 12,000,000 or more characters.

In using such magnetic drums in a computer system, accurate selection of a particular track and sector is of prime importance. Also, the time required to select a particular address on the drum prior to a reading or writing operation should be kept to a minimum. The time required for a positioning system to move a carriage from one address to another should be minimized.

After the magnetic head is positioned over a selected track, it is important that the selected position be maintained during the reading or writing operation. Very often noise or transient signals within a system are misinterpreted as being a new position signal causing the head to go off the selected track.

It is an object of this invention to provide an improved carriage positioning system.

It is an object of this invention to provide means for increasing the reliability of a servo "on track" signal in a head positioning system.

It is still a further object of this invention to provide a positioning system for a head member which is relatively insensitive to spurious electrical signals of mechanical variations.

In accordance with the present invention, means for increasing the reliability of a servo mechanism to assure that a head stays "on track" is provided. A counter circuit provides means for increasing the amplitude of a holding voltage until a new address is clearly indicated. Low level or short transient signals will therefore not be misinterpreted as new address signal to cause the servo mechanism to move the head off track.

Other objects and advantages of the present invention will be apparent and suggest themselves to those skilled in the art, from a reading of the following specification and claims, in conjunction with the accompanying drawing, in which:

FIGURE 1 is a block diagram illustrating a system involving the present invention, FIGURE 2 illustrates various signal relationships shown for purposes of explanation, and FIGURE 3 is a schematic diagram illustrating one type of circuit which may be used with the present invention.

Referring particularly to FIGURE 1, a head bar 10 carrying a plurality of magnetic heads 12 is adapted to be moved to a selected position in accordance with an applied address signal. The selected position may be one of a number of information tracks 14 on a magnetic drum 16 (partly illustrated.) The head bar 10 is driven by a servo motor 18, the speed of which is determined by the amplitude of the voltage applied thereto.

Let us consider the operation of the system when an address signal, representative of a position on a drum, is applied to an address register 20. The address signal may be a voltage derived from a binary coded signal, for example. A position pick-up potentiometer 22 or other suitable means is associated with the head bar 10 to produce a voltage, which is representative of the actual position of the head bar 10. The voltages from the address register 20 and position pickup potentiometer 22 are applied to a summing circuit 24. The voltage from the summing circuit 24, equal to the difference between the voltage from the address register 20 and the potentiometer 22, may be considered as an error positioning voltage which corresponds to the actual position of the head bar 10 during a positioning operation and the position being sought by the head bar 10 during the positioning operation.

The error positioning voltage must generally be combined with a damping voltage to damp the movement of the head bar 10 as it is moved to a selected position. A damping voltage, generally out of phase with the error positioning voltage, is provided by a source of velocity voltage 28. The error positioning voltage and the velocity voltages are combined in a summing circuit 25. The output signal from the summing circuit 25 is applied to drive the servo motor 18.

The error positioning voltage from the summing circuit 24 is also applied to a second summing circuit 26. The damping voltage, representing the velocity of the servo motor 18, and consequently the carriage 10, is also applied to the summing circuit 26 from a source 28, which may be a tachometer, or other suitable means. The tachometer may be associated with the servo motor 18 to generate a voltage representative of the speed of the servo motor. The output voltage from the summing circuit 26, equal to the difference between the positioning error and velocity voltages, is used to detect various conditions which are effective to disconnect or make inoperative the servo motor 18 and bring about other operations in the system.

During a positioning operation, as when the head bar 10 is moving closer to a desired information track on a magnetic drum, the voltage from the position pick-up potentiometer source 22 continuously changes and approaches the voltage from the address register 20. The output voltage, representing a difference voltage, from the summing circuit 24 decreases as the head bar 10 moves closer to the selected track on the magnetic drum.

When the voltage from the summing circuit 24 approaches zero, the condition is detected and the servo motor 18 driving the carriage 10 becomes inoperative. At this point, a detector circuit 30 detects the zero condition and produces a signal to actuate a utilization circuit 32, which may, for example, be a Schmitt trigger circuit. The utilization circuit 32 may include various circuits for controlling other operations in the computer system. A source of reference voltage 34 is also connected to the detector 30 through an amplitude control circuit and the summing circuit 26, for a reason to be described.

When the Schmitt trigger circuit 32 is actuated, control means within the system may be actuated to turn off the driving power applied to the servo motor 18. This indicates the heads 12 are at the desired tracks 14 on the drum 16. Up to this point, the system described is similar to that described in a copending application of B, L. Romvari entitled, "Zero Detector for a Positioning System," Ser. No. 53,583, filed Aug. 26, 1960 (now U.S. Patent 3,209,338), and assigned to the same assignee as the present invention. The present invention involves the additional means of providing a holding voltage to keep the heads 12 "on track" and making the system relatively insensitive to noise or other low level transient signals which may be interpreted as a new position signal. Such noise or transient signals tend to start up the servo motor 18 and move the heads 12 off their selected positions.

In general, when the Schmitt trigger circuit 32 is switched by a signal from the detector circuit 30, the output signal from the circuit 32 actuates a pulse counter circuit 38. The output signal from the Schmitt trigger circuit as also applied to a delay flop circuit 39 which resets the pulse counter circuit after a predetermined time delay preiod. The output signal from the puulse counter circuit 38 is applied to the pulse amplitude control circuit 36. When an output signal is applied to the pulse control circuit 36 from the counter circuit 38, the amplitude of the signal from the amplitude control circuit 36, which is applied to the summing circuit 26, is increased from its normal value to a higher value.

The output signal of the reference voltage source 34 may be considered as being increased as long as an output signal is developed at the pulse counter circuit 38. With no output signal from the counter circuit 38, the output signal from the amplitude control circuit 36, representing the output voltage the reference voltage source 34, may be considered normal or relatively low. The latter state is the condition of operation when the heads 12 are being moved as during a positioning operation. The state in which the output signal from the amplitude control circuit 36 is high represents the operating state of the system when the heads 12 are on track as when they may be performing a reading or writing operation.

Referring particularly to FIGURE 2, a waveform 40 represents the output voltage from the summing circuit 26. As mentioned, a first part of this voltage ($e_p$) represents the combined output voltage of the positioning signal, i.e. the signal from the summing circuit 24 which, in turn, represents the difference between the address signal from the source 20 and the position signal from the source 22. A second part of this voltage represents the velocity voltage ($e_v$) from the source 28. The first and second parts are indicated by the main curve portions of the waveform 40 ($e_p+e_v$). A third part of the voltage represents the output signals from the reference source 34. The third part is represented by the spikes or pulses 42 in the waveform 40.

A line 44 represents a zero voltage level with respect to some reference level, normally designated as ground, for example. A line 46 represents the voltage level which must be applied to set the Schmitt trigger circuit 32. A line 48 represents a voltage level which must be applied to reset the Schmitt trigger circuit 32. The differences in voltages necessary to set and reset a bistable circuit or relay is related to a hysteresis effect well known to those skilled in the art.

In order to achieve positioning of the heads 12, the servo motor 18 may be inactuated while the head bar 10 is still moving at a relatively low speed and is close to its selected position. The timing of the inactuation of the servo motor 18 must be such that the head bar 10 will continue to move at a slow speed and stop at the correct selected position.

The Schmitt trigger circuit 32 may be made operative to change its state at a time which is dependent upon the amplitude of the pulses 42. In designing a system, the exact amplitude of the pulses 42 may involve various mechanical considerations to determine a safe point to disconnect the servo motor from the head bar. The output voltage from the Schmitt trigger circuit 32 may control the operation of a flip-flop, for example, to control various functions within a computer. Also the output signal from the Schmitt trigger circuit, when in its "set" state controls the operation of the pulse counter circuit 38.

When the Schmitt trigger circuit is set by one of the pulse signals 42 crossing the voltage level, represented by the line 46, the pulse counter circuit 38 produces an output signal, after a five pulse delay period. The output from the Schmitt trigger circuit applied to the control circuit 36 has the effect of increasing the amplitude of the pulses 42 after the five pulse time period. The amplified signals are represented by pulses 50. Once a signal is developed by the pulse counter 38, it continues to be applied to the control circuit 36 as long as the Schmitt trigger circuit 32 triggers and for a predetermined time period thereafter until the pulse counter 38 resets, this time period being determined by the delay flop circuit 39. In the example given, as illustrated in FIGURE 2, this time period is three pulse periods, although it may be more or less.

An output signal therefore actuates the pulse counter circuit 38 as long as the Schmitt trigger circuit 32 is triggered by reference source 34 and for a period of time after the Schmitt trigger circuit has dropped below its set level.

It may be seen that once the Schmitt trigger circuit has been set that the heads 12 are over their selected tracks. The Schmitt trigger circuit 32 will be triggered by pulses from the detector circuit 30 to develop output pulse signals which are applied to the pulse counter circuit 38.

The pulse counter circuit 38 produces one of two voltage level signals dependent upon whether or not input pulses are being developed by the Schmitt trigger circuit. A level signal to increase the amplitude of the pulse signals will be developed as long as the Schmitt trigger delivers pulses and for a short period thereafter. When the Schmitt trigger stops pulsing, the counter 38 maintains the same output voltage level for a predetermined time period and then resets. This condition is illustrated in FIGURE 2.

Counter circuits, delay flop circuits and summing circuits are all very well known to those skilled in the art. For the proposal of clarity and because such circuits are only indirectly related to the present invention, the details of such circuits are not given.

It has been seen that when the error positioning signal is zero that the heads 12 will be on track. In order for the heads 12 to move off track, it is necessary that the error signal exceed a predetermined level for a predetermined time period before the combined signal applied to the Schmitt trigger circuit will be of sufficient amplitude to reset the Schmitt trigger circuit. Thus, any short transient signals or low level signals, such as noise, will not tend to be misinterpreted as being a new error positioning signal. Thus the system becomes relatively insensitive to signals other than true new position signals thereby assuring greater reliability in keeping the heads 12 on track.

The output signal from the pulse counter circuit 38 is also applied to a brake mechanism 52 to hold the head bar 10 stationary during a reading or writing operation. During a positioning operation as when the heads 12 are being moved, the brake 52 is released.

Referring to FIGURE 3, a simple circuit is illustrated which may be used for varying the amplitude of the input pulses. An input signal of one of two levels is applied from the pulse counter circuit 38 through an inverter 41 to a diode 51. The two levels of voltage are illustrated by a waveform 54. The diode 51 is connected to point 56 through a resistor 58. The pulse signals from the reference voltage source is also applied to the point 56 through a resistor 60. The point 56, at which pulse signals of one of two different amplitudes will be developed, is applied to the summing circuit 26.

When the voltage level from the pulse counter 38 is low, the output signal from the inverter 41 may be at 0 volts. The diode 52 will be forward biased whenever the pulses from the source 34 drops below zero volts. When the signal from the pulse counter circuit 38 is high, the output signal from the inverter 41 will be −8 volts. This causes the diode 52 to stay back biased. Thus the level of the pulses applied to the summing circuit 26 will be controlled by the output signal from the pulse counter 38.

There has thus been provided a relatively simple circuit for providing an additional holding voltage for maintaining heads on track for a predetermined period of time. The effects of transient and other spurious types of signals will therefore be minimized and therefore increase the overall reliability of a system designed to keep a head on a selected track.

The embodiments of the invention in which an exclusive property or privilege is claimed are defined as follows:

1. A servo mechanism for driving a device to a selected position comprising a source of error voltage, a source of damping voltage, a source of reference voltage for producing signals of two different levels, means for combining said error, damping and reference voltages to produce a first combined voltage, means for combining said error and damping voltages to produce a second combined voltage, means for applying said second combined voltage to drive said servo mechanism, a utilization circuit to control the operation of said servo mechanism, means for actuating said utilization circuit when said first combined voltage drops below a predetermined level, and means for shifting said reference voltage to a relatively high level when said utilization circuit is actuated.

2. A servo mechanism for driving a magnetic head carrying carriage to a selected position over a recording medium comprising a source of error voltage, a source of damping voltage, a source of reference voltage for producing pulse signals, means for combining said error, damping and references voltages to produce a first combined voltage, means for combining said error and damping voltages to produce a second combined voltage, means for applying said second combined voltage to drive said servo mechanism, a utilization circuit to control the operation of said servo mechanism, means for actuating said utilization circuit when said first combined voltage drops below a predetermined level, and means for shifting the amplitude of said pulse signals of said reference voltage to a relatively high level when said utilization circuit is actuated whereby said utilization circuit is maintained actuated for a predetermined period of time regardless of the amplitude of said error and damping voltages.

3. A servo mechanism for driving a shaft element carrying a plurality of magnetic heads to selected information tracks on a magnetic drum comprising a source of error voltage, said error voltage resulting from combining address and position voltages, a source velocity voltage representative of the speed of said shaft element, a source of reference voltage for producing pulse signals, means for combining said error, damping and reference voltages to produce a first combined voltage, means for combining said error and damping voltages to produce a second combined voltage, means for applying said second combined voltage to drive said servo mechanism, a utilization circuit to control the operation of said servo mechanism, means for actuating said utilization circuit when said first combined voltage drops below a predetermined level, means for shifting the amplitude of said pulse signals of said reference voltage to a relatively high level when said utilization circuit is actuated whereby said utilization circuit is maintained actuated for a predetermined time period, said utilization circuit becoming inactuated to permit operation of said servo mechanism when said error voltage exceeds a predetermined amplitude.

4. The invention as set forth in claim 3 wherein said predetermined time period is controlled by a delay flop circuit.

5. The invention as set forth in claim 3 wherein said means for increasing the amplitude of said series of pulses includes a diode gating circuit.

6. In a positioning system comprising a head bar, a plurality of magnetic heads carried by said head bar, a magnetic drum including a plurality of information tracks, a servo mechanism for driving said head bar to a selected position to locate said magnetic heads over selected information tracks of said magnetic drum, means for producing an error voltage representative of the position of said magnetic heads and the locations of the information tracks being sought by said magnetic heads during a positioning operation, means for producing a velocity voltage representative of the velocity of said head bar during said positioning operation, said error and velocity voltages being of the same polarity during said positioning operation, the improvement comprising, a source of reference voltage comprising a series of pulses of opposite polarity to the polarity of said error and velocity voltages, means for combining said error and velocity voltages to produce a combined voltage, means for applying said combined voltage to drive said servo mechanism, a control circuit normally operative in a first state to permit operation of said servo mechanism and operative in a second state to render said servo mechanism inoperative, means for applying said combined voltage and said series of pulses to said control circuit, said control circuit being responsive to operate in its first state when the amplitude of said combined voltage is below a predetermined level, said control circuit switching to its second state when the amplitude of said combined voltage is above a predetermined level, and means for increasing the amplitude of said series of pulses for a predetermined time period whereby said control circuit maintains said head bar stationary until said error voltage exceeds a predetermined level.

References Cited

UNITED STATES PATENTS

| | | | |
|---|---|---|---|
| 3,126,535 | 3/1964 | Streeter | 340—174.1 |
| 3,209,338 | 9/1965 | Romvari | 340—174.1 |

BERNARD KONICK, *Primary Examiner.*

B. H. HALEY, *Assistant Examiner.*